United States Patent
Ojiri et al.

(10) Patent No.: US 10,847,762 B2
(45) Date of Patent: Nov. 24, 2020

(54) BATTERY PACKAGING MATERIAL, METHOD FOR MANUFACTURING SAME, METHOD FOR DETERMINING DEFECT DURING MOLDING OF BATTERY PACKAGING MATERIAL, AND ALUMINUM ALLOY FOIL

(71) Applicant: DAI NIPPON PRINTING CO., LTD., Tokyo (JP)

(72) Inventors: Tetsuya Ojiri, Tokyo (JP); Hiroshi Kishida, Tokyo (JP); Kenji Kanda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 49 days.

(21) Appl. No.: 16/092,249

(22) PCT Filed: Apr. 14, 2017

(86) PCT No.: PCT/JP2017/015327
§ 371 (c)(1),
(2) Date: Oct. 9, 2018

(87) PCT Pub. No.: WO2017/179712
PCT Pub. Date: Oct. 19, 2017

(65) Prior Publication Data
US 2019/0148682 A1 May 16, 2019

(30) Foreign Application Priority Data

Apr. 14, 2016 (JP) ................................ 2016-081093

(51) Int. Cl.
*H01M 2/02* (2006.01)
*C22C 21/00* (2006.01)
(Continued)

(52) U.S. Cl.
CPC ............ *H01M 2/0287* (2013.01); *C22C 21/00* (2013.01); *H01G 11/78* (2013.01); *H01G 11/82* (2013.01);
(Continued)

(58) Field of Classification Search
CPC .... H01M 2/0287; H01M 2/02; H01M 2/0202; H01M 2/0285; C22C 21/00; H01G 11/78; H01G 11/82
See application file for complete search history.

(56) References Cited

U.S. PATENT DOCUMENTS

2008/0286635 A1   11/2008  Seino et al.
2014/0242450 A1   8/2014   Oono et al.
(Continued)

FOREIGN PATENT DOCUMENTS

JP    2008-287971 A    11/2008
JP    2014-065956 A    4/2014
(Continued)

OTHER PUBLICATIONS

Jul. 11, 2017 International Search Report issued in International Patent Application No. PCT/JP2017/015327.

*Primary Examiner* — Helen Oi K Conley
(74) *Attorney, Agent, or Firm* — Oliff PLC (57) ABSTRACT

A battery packaging material has a very thin aluminum alloy foil with a thickness of not more than 40 μm, in which pinholes or cracks are unlikely to occur during molding, which has excellent moldability and appearance after molding, which is unlikely to be erroneously determined to be a defective product, and which makes highly accurate defect determination possible. The battery packaging material includes a stacked member provided with at least, in this order: a base material layer; an aluminum alloy foil layer; and a heat sealable resin layer, wherein: the aluminum alloy (Continued)

foil layer has a thickness of not more than 40 μm; the aluminum alloy foil layer is an aluminum alloy conforming to JIS standard A8021; and the aluminum alloy has a maximum crystal grain size of not more than 25 μm, and an average crystal grain size of not more than 10 μm.

14 Claims, 3 Drawing Sheets

(51) Int. Cl.
    *H01G 11/78*     (2013.01)
    *H01G 11/82*     (2013.01)

(52) U.S. Cl.
    CPC ........... *H01M 2/02* (2013.01); *H01M 2/0202* (2013.01); *H01M 2/0285* (2013.01); *H01M 2002/0297* (2013.01)

(56) References Cited

U.S. PATENT DOCUMENTS

| | | |
|---|---|---|
| 2016/0172638 A1 | 6/2016 | Amano et al. |
| 2017/0274622 A1 | 9/2017 | Amano et al. |

FOREIGN PATENT DOCUMENTS

| | | |
|---|---|---|
| JP | 2014-078513 A | 5/2014 |
| JP | 5725224 B1 | 5/2015 |
| JP | 2015-203154 A | 11/2015 |
| JP | 2106-057271 A | 4/2016 |
| JP | 2016-156059 A | 9/2016 |
| WO | 2012/036181 A1 | 3/2012 |
| WO | 2016/047389 A1 | 3/2016 |

BATTERY PACKAGING MATERIAL, METHOD FOR MANUFACTURING SAME, METHOD FOR DETERMINING DEFECT DURING MOLDING OF BATTERY PACKAGING MATERIAL, AND ALUMINUM ALLOY FOIL

TECHNICAL FIELD

The present invention relates to a battery packaging material, a method for manufacturing the battery packaging material, a method for determining a defect during molding of a battery packaging material, and an aluminum alloy foil.

BACKGROUND ART

Various types of batteries have been developed heretofore, and in every battery, a packaging material is an essential member for encapsulating a battery element such as an electrode and an electrolyte. Metallic packaging materials have often been used for battery packaging heretofore.

On the other hand, in recent years, batteries are being required to be diversified in shape and to be reduced in thickness and weight along with improvement in performance of, for example, electric cars, hybrid electric cars, personal computers, cameras, and mobile phones. Metallic battery packaging materials that have often been used heretofore, however, have trouble in keeping up with diversification in shape and also have a disadvantage of limiting the reduction in weight.

Thus, in recent years, there has been proposed a film-shaped laminate obtained by laminating a base material, an aluminum alloy foil layer, and a heat-weldable resin layer in this order, as a battery packaging material that is easily processed into diversified shapes and is capable of achieving the reduction in thickness and weight.

In such a battery packaging material, generally, a concave portion is formed by cold molding, a battery element such as an electrode and an electrolytic solution are disposed in a space formed by the concave portion, and portions of the heat-weldable resin layer are heat-welded to each other to give a battery with the battery element stored in the battery packaging material. Such a film-shaped packaging material, however, is thinner than a metallic packaging material and has a disadvantage of easily generating pinholes and cracks during molding. In a battery packaging material where pinholes and cracks have been generated, an electrolytic solution may permeate as far as the aluminum alloy foil layer to form a metal precipitate, possibly resulting in generation of a short-circuit. Therefore, it is essential for the film-shaped battery packaging material to have a property of being unlikely to generate pinholes during molding, i.e. excellent moldability.

For example, Patent Document 1 discloses that in a laminated packaging material including an inner layer formed of a resin film, a first adhesive agent layer, a metal layer, a second adhesive agent layer, and an outer layer formed of a resin film, at least one of the first adhesive agent layer or the second adhesive agent layer is formed from an adhesive agent composition containing a resin having an active hydrogen group on a side chain, a polyfunctional isocyanate, and a polyfunctional amine compound to give a packaging material having high reliability in deeper molding.

PRIOR ART DOCUMENT

Patent Document

Patent Document 1: Japanese Patent Laid-open Publication No. 2008-287971

SUMMARY OF THE INVENTION

Problems to be Solved by the Invention

In recent years, a battery packaging material is being required to be further reduced in film thickness, along with a requirement of reduction in size and thickness of batteries. Along with this requirement, an aluminum alloy foil layer laminated in the battery packaging material is being required to be further reduced in thickness. The aluminum alloy foil layer having a small thickness, however, has a problem of easily generating pinholes and cracks thereon during molding.

Further, as a result of studies of the present inventors, it has been newly found that the aluminum alloy foil layer having a thickness of as small as about 40 μm sometimes forms, even when generating no pinholes and cracks, a fine recess and projection pattern (pocked pattern) on a surface of the aluminum alloy foil layer after molding of a battery packaging material.

In a production line of batteries, a molded battery packaging material is confirmed on the basis of an image captured with, for example, a camera, that no defects such as pinholes and cracks have been generated. Specifically, the battery packaging material is inspected for defects by capturing with a camera a surface of the battery packaging material from a transparent base material-layer side and/or transparent heat-weldable resin-layer side of the battery packaging material. The studies of the present inventors, however, have revealed that it is very difficult for a defect inspection device to automatically determine, on the basis of an image, the difference between when a fine recess and projection pattern has been formed on a surface of the aluminum alloy foil layer as described above and when pinholes and cracks have been generated in the battery packaging material, so that the defect inspection device anyway determines, as a defective product, the battery packaging material having a fine recess and projection pattern on the surface of the aluminum alloy foil layer even though having generated no pinholes and cracks, to decrease yield in manufacture of batteries.

Under such circumstances, a main object of the present invention is to provide a battery packaging material that includes a thin aluminum alloy foil having a thickness of as small as 40 μm or less, the battery packaging material being unlikely to generate pinholes and cracks during molding, not only having excellent moldability but being also excellent in appearance after molding, suppressing erroneous determination, and allowing highly accurate determination for a defective product.

Means for Solving the Problems

The present inventors have conducted earnest studies to solve the above-mentioned problems. As a result, the present inventors have found that as regards a battery packaging material that includes a laminate having at least a base material layer, an aluminum alloy foil layer, and a heat-weldable resin layer in this order, when the aluminum alloy foil layer even has a thickness of 40 μm or less but is formed of an aluminum alloy conforming to JIS A8021, with the aluminum alloy having a maximum crystal grain size of 25 µm or less and an average crystal grain size of 10 µm or less, the battery packaging material is unlikely to generate pinholes and cracks during molding, not only has excellent moldability but is also excellent in appearance after molding due to the aluminum alloy's having such a uniform crystal grain size, is unlikely to be erroneously determined to be a defective product, and suppresses erroneous determination to allow highly accurate defect determination. The present invention has been completed by further repetitively conducting studies on the basis of these findings.

That is, the present invention provides a battery packaging material and a battery according to the following aspects.

Item 1. A battery packaging material including a laminate that has at least a base material layer, an aluminum alloy foil layer, and a heat-weldable resin layer in this order, the aluminum alloy foil layer having a thickness of 40 µm or less, the aluminum alloy foil layer being an aluminum alloy conforming to JIS A8021, and the aluminum alloy having a maximum crystal grain size of 25 µm or less and an average crystal grain size of 10 µm or less.

Item 2. The battery packaging material according to item 1, including:

a substantially rectangular parallelepiped space that extrudes from a heat-weldable resin-layer side to a base material-layer side of the battery packaging material and stores a battery element on the heat-weldable resin-layer side; and a curved section from a center portion to an end part of the battery packaging material in a cross-section along thickness of the battery packaging material on a straight line connecting mutually opposing corners of a portion extruding in substantially rectangular shape, the corners and the straight line being shown in plan view of the battery packaging material from the base material-layer side, wherein a ratio (n/m) of thickness n of the aluminum alloy foil layer in the curved section to thickness m of the aluminum alloy foil layer in the center portion is 45% or more and 90% or less.

Item 3. The battery packaging material according to item 1 or 2, wherein the laminate has a thickness of 150 µm or less.

Item 4. The battery packaging material according to any one of items 1 to 3, wherein the base material layer has a thickness of 30 µm or less.

Item 5. The battery packaging material according to any one of items 1 to 4, wherein the heat-weldable resin layer has a thickness of 90 µm or less.

Item 6. The battery packaging material according to any one of items 1 to 5, wherein the base material layer is formed of at least one of a polyester resin or a polyamide resin.

Item 7. The battery packaging material according to any one of items 1 to 6, wherein the aluminum alloy foil layer includes an acid resistance film layer on at least one surface of the aluminum alloy foil layer.

Item 8. The battery packaging material according to any one of items 1 to 7, being a packaging material for a secondary battery.

Item 9. A battery including: a battery element that has at least a positive electrode, a negative electrode, and an electrolyte; and a package that is formed of the battery packaging material according to any one of items 1 to 8 and stores the battery element therein.

Item 10. A method for manufacturing a battery packaging material, the method including a step of laminating at least a base material layer, an aluminum alloy foil layer, and a heat-weldable resin layer in this order to give a laminate, the aluminum alloy foil layer to be used being one described below: the aluminum alloy foil layer has a thickness of 40 µm or less, the aluminum alloy foil layer is an aluminum alloy conforming to JIS A8021, and the aluminum alloy has a maximum crystal grain size of 25 µm or less and an average crystal grain size of 10 µm or less.

Item 11. A method for determining a defect during molding of a battery packaging material, the method including the following steps: step 1: preparing a battery packaging material that includes a laminate having at least a base material layer, an aluminum alloy foil layer, and a heat-weldable resin layer in this order, the aluminum alloy foil layer having a thickness of 40 µm or less, the aluminum alloy foil layer being an aluminum alloy conforming to JIS A8021, and the aluminum alloy having a maximum crystal grain size of 25 µm or less and an average crystal grain size of 10 µm or less; step 2: subjecting the battery packaging material to molding; and step 3: determining whether or not pinholes or cracks exist on the aluminum alloy foil from an image obtained by capturing a surface of the battery packaging material molded.

Item 12. An aluminum alloy foil used for a battery packaging material, the aluminum alloy foil having a thickness of 40 µm or less, the aluminum alloy foil being an aluminum alloy conforming to JIS A8021, and the aluminum alloy having a maximum crystal grain size of 25 µm or less and an average crystal grain size of 10 µm or less.

Item 13. Use of an aluminum alloy foil in a battery packaging material, the aluminum alloy foil having a thickness of 40 µm or less, the aluminum alloy foil being an aluminum alloy conforming to JIS A8021, and the aluminum alloy having a maximum crystal grain size of 25 µm or less and an average crystal grain size of 10 µm or less.

Advantages of the Invention

According to the present invention, as regards a battery packaging material that includes a laminate having at least a base material layer, an aluminum alloy foil layer, and a heat-weldable resin layer in this order, because the aluminum alloy foil layer even has a thickness of 40 µm or less but is an aluminum alloy conforming to JIS A8021, with the aluminum alloy having a maximum crystal grain size of 25 µm or less and an average crystal grain size of 10 µm or less, the battery packaging material is unlikely to generate pinholes and cracks during molding, not only has excellent moldability but is also excellent in appearance after molding, and is unlikely to be erroneously determined to be a defective product. The battery packaging material according to the present invention has excellent moldability and excellent appearance after molding and is inhibited from being erroneously determined to be a defective product, so that the battery packaging material is capable of improving the accuracy of quality control to attribute to improvement in productivity of batteries.

EMBODIMENTS OF THE INVENTION

A battery packaging material according to the present invention is characterized by including a laminate that has at least a base material layer, an aluminum alloy foil layer, and a heat-weldable resin layer in this order, the aluminum alloy foil layer having a thickness of 40 µm or less, the aluminum alloy foil layer being an aluminum alloy conforming to JIS A8021, and the aluminum alloy having a maximum crystal grain size of 25 µm or less and an average crystal grain size of 10 µm or less. Hereinafter, the battery packaging material according to the present invention is described in detail.

1. Laminated Structure of Battery Packaging Material

Figure 1:
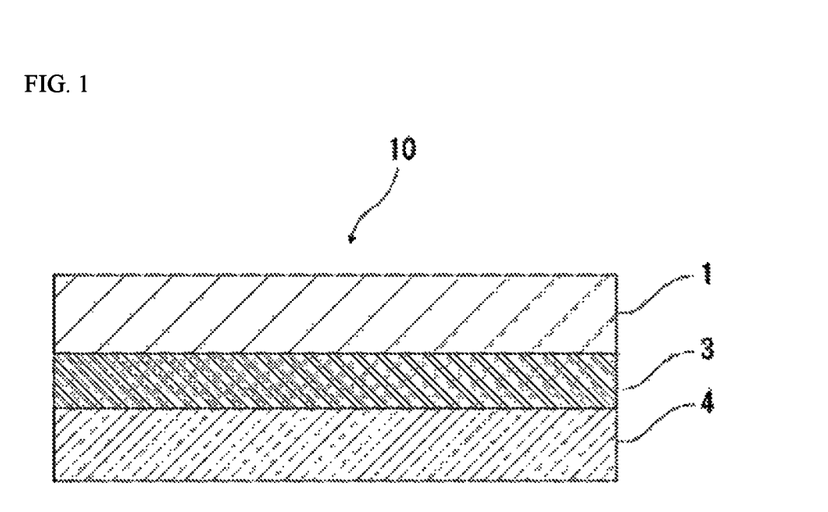
FIG. 1 is a view showing one exemplified cross-sectional structure of a battery packaging material according to the present invention.

The battery packaging material includes a laminate having at least a base material layer 1, an aluminum alloy foil layer 3, and a heat-weldable resin layer 4 in this order as shown in FIG. 1. In the battery packaging material according to the present invention, the base material layer 1 is disposed on a battery packaging material's outermost-layer side and the heat-weldable resin layer 4 is an innermost layer. That is, portions of the heat-weldable resin layer 4 that are situated on a periphery of a battery element are heat-welded to each other to hermetically seal the battery element in the heat-weldable resin layer during assembly of a battery, so that the battery element is encapsulated.

Figure 2:
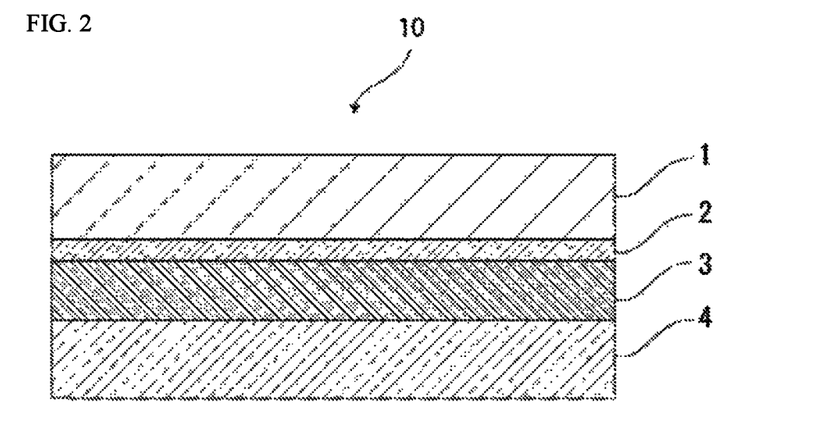
FIG. 2 is a view showing one exemplified cross-sectional structure of the battery packaging material according to the present invention.
Figure 3:
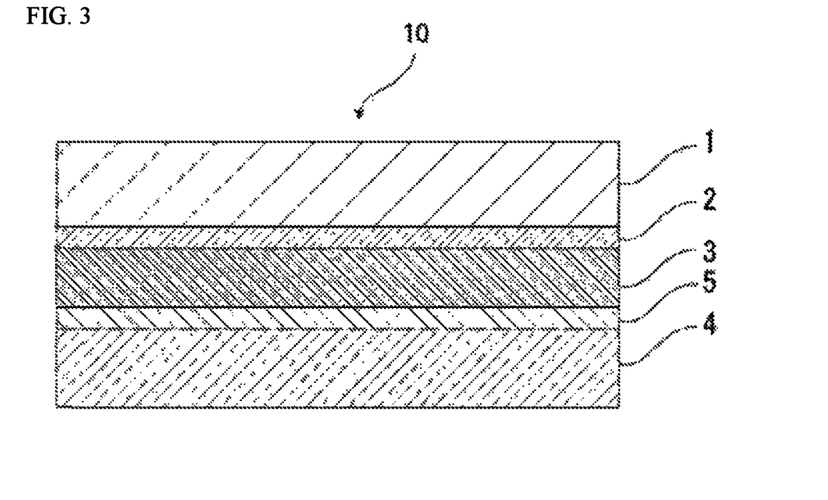
FIG. 3 is a view showing one exemplified cross-sectional structure of the battery packaging material according to the present invention.

As shown in FIGS. 2 and 3, the battery packaging material according to the present invention may be provided with an adhesive layer 2 between the base material layer 1 and the aluminum alloy foil layer 3 as necessary, for the purpose of increasing adhesiveness between these layers. As shown in FIG. 3, an adhesive layer 5 may be provided between the aluminum alloy foil layer 3 and the heat-weldable resin layer 4 as necessary, for the purpose of increasing adhesiveness between these layers.

The thickness of the laminate constituting a battery packaging material 10 according to the present invention is not particularly limited but is, for example, preferably 150 µm or less, more preferably 120 µm or less, further preferably 60 µm or more and 150 µm or less, particularly preferably 60 µm or more and 120 µm or less, so as to provide the battery packaging material excellent not only in moldability but also in appearance after molding while reducing the thickness of the battery packaging material to increase the energy density of a battery. Even when the laminate constituting the battery packaging material according to the present invention is very thin having a thickness of, for example, 120 µm or less, the present invention is capable of providing the battery packaging material that suppresses generation of, for example, pinholes caused by molding and is further excellent in appearance after molding. That is, the battery packaging material according to the present invention is effectively inhibited from being erroneously determined to be a defective product to allow highly accurate defect determination and thus suppress a decrease in productivity of batteries while being capable of contributing to improvement in energy density of a battery.

2. Layers Forming Battery Packaging Material

[Base Material Layer 1]

In the battery packaging material 10 according to the present invention, the base material layer 1 is a layer situated on the battery packaging material's outermost-layer side. A material for forming the base material layer 1 is not particularly limited as long as it has an insulation quality. Examples of the material for forming the base material layer 1 include polyester, a polyamide, an epoxy resin, an acrylic resin, fluororesin, polyurethane, a silicone resin, a phenolic resin, a polyether imide, a polyimide, polycarbonate, and mixtures and copolymerized products thereof.

Specific examples of polyester include polyethylene terephthalate, polybutylene terephthalate, polyethylene naphthalate, polybutylene naphthalate, polyethylene isophthalate, copolymerized polyester with ethylene terephthalate as a main repeating unit, and copolymerized polyester with butylene terephthalate as a main repeating unit. Specific examples of the copolymerized polyester with ethylene terephthalate as a main repeating unit include copolymer polyester obtained by polymerizing ethylene terephthalate as a main repeating unit with ethylene isophthalate (abbreviated as polyethylene (terephthalate/isophthalate) and the same applies hereinafter), polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). Specific examples of the copolymerized polyester with butylene terephthalate as a main repeating unit include copolymer polyester obtained by polymerizing butylene terephthalate as a main repeating unit with butylene isophthalate (abbreviated as polybutylene(terephthalate/isophthalate) and the same applies hereinafter), polybutylene (terephthalate/adipate), polybutylene (terephthalate/sebacate), polybutylene (terephthalate/decane dicarboxylate), and polybutylene naphthalate. These types of polyester may be used alone or in combination of two or more thereof. Polyester has an advantage of being excellent in electrolytic solution resistance and unlikely to generate, for example, whitening caused by deposition of an electrolytic solution and is thus suitably used as the material for forming the base material layer 1.

Specific examples of the polyamide include aliphatic polyamides such as nylon 6, nylon 66, nylon 610, nylon 12, nylon 46, and a copolymer of nylon 6 with nylon 66; aromatic-containing polyamides such as a hexamethylenediamine-isophthalic acid-terephthalic acid copolymerized polyamide (e.g., nylon 6I, nylon 6T, nylon 6IT, and nylon 616T (I represents isophthalic acid and T represents terephthalic acid) having a structural unit derived from terephthalic acid and/or isophthalic acid) and polymethaxylylene adipamide (MXD6); alicyclic polyamides such as polyaminomethyl cyclohexyl adipamide (PACM 6); a polyamide obtained by copolymerizing a lactam component with an isocyanate component such as 4,4'-diphenylmethane-diisocyanate, and a polyester amide copolymer and a polyether ester amide copolymer as a copolymer of a copolymerized polyamide with polyester or polyalkylene ether glycol; and copolymers thereof. These polyamides may be used alone or in combination of two or more thereof. A stretched polyamide film is excellent in stretchability and capable of preventing generation of whitening caused by resin breakage in the base material layer 1 during molding and is thus suitably used as the material for forming the base material layer 1.

The base material layer 1 may be formed of a uniaxially or biaxially stretched resin film or may be formed of an unstretched resin film. Among these films, a uniaxially or biaxially stretched resin film, particularly a biaxially stretched resin film has improved heat resistance through oriented crystallization and is thus suitably used as the base material layer 1. The base material layer 1 may be formed by coating a surface of the aluminum alloy foil layer 3 with the above-mentioned material.

Among these materials, preferred as a resin film for forming the base material layer 1 are nylon and polyester, further preferred are biaxially stretched nylon and biaxially stretched polyester, and particularly preferred is biaxially stretched nylon.

The base material layer 1 can be formed into lamination with at least one of a resin film or a coating that is made of a different material, for improving pinhole resistance and insulation quality as a battery package. Specific examples of the lamination include a multilayer structure obtained by laminating a polyester film and a nylon film, and a multilayer structure obtained by laminating biaxially stretched polyester and biaxially stretched nylon. When the base material layer 1 is formed into a multilayer structure, resin films may be adhered with an adhesive agent interposed between the resin films or may be directly laminated without an adhesive agent interposed between the layers. Examples of a method for adhering resin films without an adhesive agent interposed between the resin films include methods of adhering resin films in a heat-melted state, such as a coextrusion method, a sandwich lamination method, and a thermal lamination method. When resin films are adhered with an adhesive agent interposed between the resin films, the adhesive agent to be used may be a two-liquid curable adhesive agent or a one-liquid curable adhesive agent. An adhesive mechanism of the adhesive agent is not particularly limited and may be any one of a chemical reaction type, a solvent volatilization type, a heat melting type, a heat pressing type, an electron beam curing type, an ultraviolet curing type, and the like. Examples of a component of the adhesive agent include a polyester-based resin, a polyether-based resin, a polyurethane-based resin, an epoxy-based resin, a phenolic resin-based resin, a polyamide-based resin, a polyolefin-based resin, a polyvinyl acetate-based resin, a cellulose-based resin, a (meth)acrylic-based resin, a polyimide-based resin, an amino resin, rubber, and a silicone-based resin.

The base material layer 1 has a thickness of, for example, preferably 40 µm or less, more preferably 30 µm or less, further preferably 10 µm or more and 30 µm or less, particularly preferably 10 µm or more and 25 µm or less.

[Adhesive Layer 2]

In the battery packaging material according to the present invention, the adhesive layer 2 is a layer provided between the base material layer 1 and the aluminum alloy foil layer 3 as necessary, for strongly adhering these layers to each other.

The adhesive layer 2 is formed of an adhesive agent capable of adhering the base material layer 1 to the aluminum alloy foil layer 3. The adhesive agent used for forming the adhesive layer 2 may be a two-liquid curable adhesive agent or a one-liquid curable adhesive agent. The adhesive mechanism of the adhesive agent used for forming the adhesive layer 2 is not particularly limited and may be any one of a chemical reaction type, a solvent volatilization type, a heat melting type, a heat pressing type, and the like.

Specific examples of an adhesive component that can be used for forming the adhesive layer 2 include polyester-based resins such as polyethylene terephthalate, polybutylene terephthalate, polyethylene naphthalate, polybutylene naphthalate, polyethylene isophthalate, and copolymerized polyester; a polyether-based adhesive agent; a polyurethane-based adhesive agent; an epoxy-based resin; a phenolic resin-based resin; polyamide-based resins such as nylon 6, nylon 66, nylon 12, and a copolymerized polyamide; polyolefin-based resins such as a polyolefin, a carboxylic acid-modified polyolefin, and a metal-modified polyolefin, a polyvinyl acetate-based resin; a cellulose-based adhesive agent; a (meth)acrylic-based resin; a polyimide-based resin; polycarbonate; amino resins such as a urea resin and a melamine resin; rubber such as chloroprene rubber, nitrile rubber, and styrene-butadiene rubber; and a silicone-based resin. These adhesive components may be used alone or in combination of two or more thereof. Among these adhesive components, a polyurethane-based adhesive agent is preferred, for example.

The thickness of the adhesive layer 2 is not particularly limited as long as it allows the battery packaging material to satisfy the above-mentioned physical properties while exerting a function as the adhesive layer. The thickness of the adhesive layer, however, is, for example, 1 µm or more and 10 µm or less, preferably 2 µm or more and 5 µm or less.

[Aluminum Alloy Foil Layer 3]

In the battery packaging material, the aluminum alloy foil layer 3 is a layer that not only improves the strength of the battery packaging material but also functions as a barrier layer for preventing ingress of, for example, water vapor, oxygen, and light into a battery.

As described above, in recent years, the battery packaging material is being required to be further reduced in film thickness, along with a requirement of reduction in size and thickness of batteries. Along with this requirement, the aluminum alloy foil layer laminated in the battery packaging material is also being required to be further reduced in thickness. In the present invention, the thickness of the aluminum alloy foil is very thin and set to as small as 40 µm or less, enabling very small thickness of the whole battery packaging material (for example, 150 µm or less, further 120 µm or less, further 100 µm or less). This makes it possible to effectively increase the energy density of a battery.

In the present invention, the aluminum alloy foil layer has a thickness of, for example, preferably 10 µm or more and 40 µm or less, more preferably 10 µm or more and 35 µm or less, further preferably 10 µm or more and 30 µm or less, further preferably 10 µm or more and 25 µm or less, or 20 µm or more and 30 µm or less, so as to provide the battery packaging material excellent not only in moldability but also in appearance after molding while further reducing the thickness of the battery packaging material to increase the energy density of a battery.

As described above, the present inventors have newly found that the aluminum alloy foil layer having a thickness of as small as about 40 μm sometimes forms, even when generating no pinholes and cracks, a fine recess and projection pattern (pocked pattern) on a surface of the aluminum alloy foil layer after molding of the battery packaging material. This is a phenomenon found by repetitively conducting earnest studies using various aluminum alloys (for example, JIS H4160: 1994 A8021H-O, JIS H4160: 1994 A8021P-O, JIS H4160: 1994 A8079H-O, JIS H4000: 2014 A8021P-O, and JIS H4000: 2014 A8079P-O) that have been widely used heretofore as aluminum alloy foils for the battery packaging material. Particularly, it has been revealed that A8021 that is excellent in moldability and easily reduced in thickness but that is reduced in thickness to as small as about 40 μm forms, even when generating no pinholes and cracks, a fine recess and projection pattern (pocked pattern) on a surface of the aluminum alloy foil layer after molding of the battery packaging material.

Further, additional studies of the present inventors have revealed that although such a recess and projection pattern does not particularly largely affect the physical properties of the aluminum alloy foil layer, it is difficult for a defect inspection device to automatically determine, on the basis of an image, the difference between when a fine recess and projection pattern has been formed and when pinholes and cracks have been generated in the battery packaging material, so that the defect inspection device anyway determines, as a defective product, the battery packaging material having a fine recess and projection pattern on a surface of the aluminum alloy foil layer even though having generated no pinholes and cracks, to decrease yield in manufacture of batteries.

In order to cope with this problem, the aluminum alloy foil layer 3 in the present invention is formed of an aluminum alloy conforming to JIS A8021 and the aluminum alloy has a maximum crystal grain size of 25 μm or less and an average crystal grain size of 10 μm or less to enable the battery packaging material that includes a very thin laminated aluminum alloy foil having a thickness of as small as 40 μm or less but is nevertheless unlikely to generate pinholes and cracks during molding and has excellent moldability. Further, a fine recess and projection pattern (pocked pattern) is unlikely to be formed on a surface of the aluminum alloy foil layer after molding of the battery packaging material according to the present invention, so that the battery packaging material is excellent in appearance after molding and is unlikely to be erroneously determined to be a defective product.

In the present invention, the aluminum alloy foil layer may be any aluminum alloy conforming to JIS A8021 but is particularly preferably JIS H4160: 1994 A8021P-O, JIS H4160: 1994 A8021H-O, and the like that are annealed aluminum.

In the present invention, the aluminum alloy may have any crystal grain size of 10 μm or less and has a crystal grain size of, for example, preferably 8 μm or less, more preferably 5 μm or less, so as to provide an excellent battery packaging material that not only has excellent moldability but is also excellent in appearance after molding, and is unlikely to be erroneously determined to be a defective product (that is, allows highly accurate defect determination), while further reducing the thickness of the aluminum alloy foil layer. The aluminum alloy has, as a lower limit value, an average crystal grain size of normally about 1 μm, preferably about 2 μm. On the other hand, the aluminum alloy has a maximum crystal grain size of, for example, preferably 20 μm or less, more preferably 5 μm or more and 20 μm or less, further preferably 8 μm or more and 20 μm or less, particularly preferably 10 μm or more and 20 μm or less.

Figure 7:
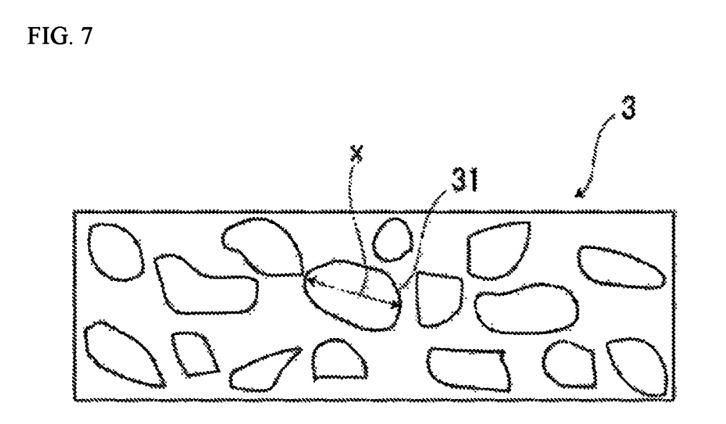
FIG. 7 is a schematic view showing crystal grains in a cross-section along the thickness of an aluminum alloy foil layer.

In the present invention, the maximum crystal grain size and the average crystal grain size of the aluminum alloy are each measured by the following method. The average crystal grain size means a value obtained by observing a cross-section along the thickness of the aluminum alloy foil layer with a scanning electron microscope (SEM), measuring, as shown in a schematic view of FIG. 7, a maximum diameter x of each of 100 crystal grains of the aluminum alloy situated in a field, and averaging the maximum diameters x of the 100 crystal grains. The maximum diameter x of each of the crystal grains means, as shown in the schematic view of FIG. 7, a diameter that makes the largest straight distance connecting between one point on an outline of a crystal grain observed with the SEM and another point on the outline of the same crystal grain. The maximum crystal grain size means the largest value among the maximum diameters x of the 100 crystal grains 31. The cross-section along the thickness of the aluminum alloy foil layer that is observed with the SEM is a cut surface obtained by cutting the aluminum alloy foil layer along a surface vertical to a rolling direction. The cross-section along the thickness of the aluminum alloy foil layer is a cross-section obtained by dividing the battery packaging material 10 into two parts through cutting the battery packaging material along its thickness with a microtome, on a straight line A-A' connecting mutually opposing corners p of a portion 10a extruding in substantially rectangular shape in plan view of the battery packaging material from a base material layer 1 side of the battery packaging material, and a portion for observation with the SEM is to be a portion situated in a center portion 11 in plan view of the battery packaging material. The maximum crystal grain size and the average crystal grain size of the aluminum alloy can also be measured by cutting a long belt-shaped battery packaging material along the thickness of the aluminum alloy foil layer and observing and analyzing the obtained cross-section with a scanning electron microscope (SEM). When the battery packaging material is cut with a microtome, it is desirable to cut the battery packaging material after fixing the battery packaging material with, for example, a resin, for preventing a change in shape of the battery packaging material. It is to be noted that FIG. 7 is a schematic view with drawing simplified and not all the 100 crystal grains 31 drawn.

The average crystal grain size of the aluminum alloy can be adjusted by a known method. Examples of the method include a method for adjusting, for example, the firing temperature, the firing time, and the rolling conditions when the aluminum alloy foil is manufactured.

The aluminum alloy foil layer 3 has at least one surface, preferably both surfaces thereof subjected to a chemical conversion treatment to preferably include an acid resistance film layer, for example, for stabilizing the adherence and preventing dissolution and corrosion. Here, the chemical conversion treatment is a treatment for forming an acid resistance film on the surface(s) of the aluminum alloy foil layer. Examples of the chemical conversion treatment include a chromate treatment using a chromium compound such as chromium nitrate, chromium fluoride, chromium sulfate, chromium acetate, chromium oxalate, chromium biphosphate, acetylacetate chromate, chromium chloride, or chromium potassium sulfate; a phosphoric acid chromate treatment using a phosphoric acid compound such as sodium phosphate, potassium phosphate, ammonium phosphate, or polyphosphoric acid; and a chromate treatment using an aminated phenolic polymer having a repeating unit(s) represented by the following general formulae (1) to (4). In the aminated phenolic polymer, the repeating units represented by the formulae (1) to (4) may be contained alone or in any combination of two or more thereof.

[Chemical Formula 1]

(1)

[Chemical Formula 2]

(2)

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group, or a benzyl group. $R_1$ and $R_2$ are the same or different, and each represent a hydroxyl group, an alkyl group, or a hydroxyalkyl group. In the general formulae (1) to (4), examples of the alkyl group represented by X, $R^1$, and $R^2$ include a linear or branched alkyl group having 1 or more and 4 or less carbon atoms, such as a methyl group, an ethyl group, an n-propyl group, an isopropyl group, an n-butyl group, an isobutyl group, and a tert-butyl group. Examples of the hydroxyalkyl group represented by X, $R^1$, and $R^2$ include a linear or branched alkyl group that is substituted with one hydroxy group and has 1 or more and 4 or less carbon atoms, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl groups and the hydroxyalkyl groups represented by X, $R^1$, and $R^2$ may be the same or different. In the general formulae (1) to (4), X is preferably a hydrogen atom, a hydroxyl group, or a hydroxyalkyl group. The number average molecular weight of the aminated phenolic polymer having a repeating unit(s) represented by the general formulae (1) to (4) is, for example, preferably 500 or more and 1000000 or less, more preferably 1000 or more and 20000 or less.

Examples of a chemical conversion treatment method for imparting corrosion resistance to the aluminum alloy foil layer 3 include a method for coating the aluminum alloy foil layer with a dispersion containing fine particles of a metal oxide, such as aluminum oxide, titanium oxide, cerium oxide, or tin oxide, or barium sulfate in phosphoric acid, and baking the aluminum alloy foil layer at 150° C. or higher to form a corrosion resistance treatment layer on a surface of the aluminum alloy foil layer 3. A resin layer obtained by crosslinking a cationic polymer with a crosslinking agent may be further formed on the corrosion resistance treatment layer. Here, examples of the cationic polymer include polyethyleneimine, an ion polymer complex formed of a polymer having polyethyleneimine and a carboxylic acid, a primary amine-grafted acrylic resin obtained by graft-polymerizing a primary amine with an acrylic main backbone, polyallylamine or derivatives thereof, and an aminophenol. These cationic polymers may be used alone or in combination of two or more thereof. Examples of the crosslinking agent include a compound having at least one functional group selected from the group consisting of an isocyanate group, a glycidyl group, a carboxyl group, and an oxazoline group, and a silane coupling agent. These crosslinking agents may be used alone or in combination of two or more thereof.

A method for specifically providing the acid resistance film is, for example, a method for first decreasing at least an inner-layer side surface of the aluminum alloy foil by a known treatment method such as an alkali immersion method, an electrolytic cleaning method, an acid cleaning method, an electrolytic acid cleaning method, or an acid activation method, and then coating the degreased surface with a treatment solution (aqueous solution) containing, as a main component, metal phosphate salts such as chromium phosphate salt, titanium phosphate salt, zirconium phosphate salt, and zinc phosphate salt and a mixed product of these metal salts, with a treatment solution (aqueous solution) containing, as a main component, nonmetal phosphate slats and a mixed product of these nonmetal salts, or with a treatment solution (aqueous solution) containing a mixture of these metal phosphate salts and/or nonmetal phosphate salts with an aqueous synthetic resin such as an acrylic resin, a phenolic resin, or a urethane resin, by a known coating method such as roll coating, gravure printing, or an immersion method. Thus, it is possible to form an acid resistance film. For example, a treatment with a chromium phosphate salt-based treatment solution forms an acid resistance film made of chromium phosphate, aluminum phosphate, aluminum oxide, aluminum hydroxide, aluminum fluoride, or the like and a treatment with a zinc phosphate salt-based treatment solution forms an acid resistance film made of zinc phosphate hydrate, aluminum phosphate, aluminum oxide, aluminum hydroxide, aluminum fluoride, or the like.

Another example of the specific method for providing an acid resistance film is, for example, a method for first decreasing at least an inner-layer side surface of the aluminum alloy foil by a known treatment method such as an alkali immersion method, an electrolytic cleaning method, an acid cleaning method, an electrolytic acid cleaning method, or an acid activation method, and then subjecting the degreased surface to a known anodization treatment. Thus, it is possible to form an acid resistance film.

Other examples of the acid resistance film include a phosphate salt-based film and a chromic acid-based film. Examples of the phosphate salt-based film include a zinc phosphate film, an iron phosphate film, a manganese phosphate film, a calcium phosphate film, and a chromium phosphate film. Examples of the chromic acid-based film include a chromium chromate film.

As another example of the acid resistance film, the acid resistance film is formed of, for example, a phosphate slat, a chromate slat, fluoride, or a triazine thiol compound to exhibit an effect of preventing delamination between aluminum and the base material layer during emboss molding, preventing dissolution and corrosion of a surface of aluminum, particularly dissolution and corrosion of aluminum oxide existing on a surface of aluminum that are caused by hydrogen fluoride generated through a reaction of an electrolyte with moisture, improving adhesiveness (wettability) on a surface of aluminum, preventing delamination between the base material layer and aluminum during heat sealing, and preventing, for embossed aluminum, delamination between the base material layer and aluminum during press molding. Among the substances for forming the acid resistance film, good for application to a surface of aluminum and bake drying is an aqueous solution formed of three components, i.e., a phenolic resin, a chromium(III) fluoride compound, and phosphoric acid.

The acid resistance film includes a layer containing cerium oxide, phosphoric acid or a phosphate salt, an anionic polymer, and a crosslinking agent for crosslinking the anionic polymer, and the phosphoric acid or the phosphate salt may be blended in an amount of 1 part by mass or more and 100 parts by mass or less relative to 100 parts by mass of the cerium oxide. The acid resistance film preferably has a multilayer structure further including a layer that contains a cationic polymer and a crosslinking agent for crosslinking the cationic polymer.

The anionic polymer is preferably a copolymer containing, as a main component, poly(meth)acrylic acid or a slat thereof, or (meth)acrylic acid or a salt thereof. The crosslinking agent is preferably at least one selected from the group consisting of a compound having any one functional group of an isocyanate group, a glycidyl group, a carboxyl group, and an oxazoline group, and a silane coupling agent.

The phosphoric acid or the phosphate salt is preferably condensed phosphoric acid or a condensed phosphate salt.

As for the chemical conversion treatment, only one chemical conversion treatment may be performed, or two or more chemical conversion treatments may be performed in combination. These chemical conversion treatments may be performed using one compound alone or two or more compounds in combination. Among the chemical conversion treatments, preferred are, for example, a chromate treatment and a chemical conversion treatment using a chromium compound, a phosphoric acid compound, and an aminated phenolic polymer in combination. Particularly, the chromium compound is preferably a chromic acid compound.

Specific examples of the acid resistance film include a film containing at least one of a phosphate salt, a chromate salt, fluoride, or triazine thiol. An acid resistance film containing a cerium compound is also preferred. The cerium compound is preferably cerium oxide.

Specific examples of the acid resistance film also include a phosphate salt-based film, a chromate salt-based film, a fluoride-based film, and a triazine thiol compound film. The acid resistance film may be one of these films or a combination of a plurality of films. Further, the acid resistance film may be a film formed with a treatment solution containing a mixture of a metal phosphate salt with an aqueous synthetic resin or a treatment solution containing a mixture of a nonmetal phosphate salt with an aqueous synthetic resin, after degreasing a surface of an aluminum alloy foil to be subjected to a chemical conversion treatment.

The composition of the acid resistance film can be analyzed according to, for example, time-of-flight secondary ion mass spectrometry. The analysis of the composition of the acid resistance film according to time-of-flight secondary ion mass spectrometry allows detection of, for example, a peak(s) derived from at least one of $Ce^+$ or $Cr^+$.

A surface of the aluminum alloy foil preferably includes the acid resistance film containing at least one element selected from the group consisting of phosphorus, chromium, and cerium. It is possible to confirm by X-ray photoemission spectroscopy that the acid resistance film on the surface of the aluminum alloy foil in the battery packaging material contains at least one element selected from the group consisting of phosphorus, chromium, and cerium. Specifically, first, the heat-weldable resin layer, the adhesive agent layer, and the like are physically delaminated that have been laminated on the aluminum alloy foil in the battery packaging material. Next, the aluminum alloy foil is put in an electric furnace and heated at about 300° C. for about 30 minutes to remove an organic component existing on the surface of the aluminum alloy foil. Subsequently, the surface of the aluminum alloy foil is confirmed by X-ray photoemission spectroscopy that the surface contains the element(s).

The amount of the acid resistance film to be formed on the surface of the aluminum alloy foil layer 3 in the chemical conversion treatment is not particularly limited, but, for example, when a chromate treatment is performed, it is desirable that the chromium compound be contained in an amount of about 0.5 mg or more and about 50 mg or less, preferably about 1.0 mg or more and about 40 mg or less, in terms of chromium, the phosphorus compound be contained in an amount of about 0.5 mg or more and about 50 mg or less, preferably about 1.0 mg or more and about 40 mg or less, in terms of phosphorus, and the aminated phenolic polymer be contained in an amount of about 1.0 mg or more and 200 mg or less, preferably about 5.0 mg or more and 150 mg or less, per 1 $m^2$ of the surface of the aluminum alloy foil layer 3.

The thickness of the acid resistance film is not particularly limited but is, for example, preferably about 1 nm or more and about 10 μm or less, more preferably about 1 nm or more and about 100 nm or less, further preferably about 1 nm or more and about 50 nm or less, from a viewpoint of cohesion force of the film and adhesion force between the aluminum alloy foil and the heat-weldable resin layer. The thickness of the acid resistance film can be measured by observation with a transmission electron microscope or by a combination of observation with a transmission electron microscope and energy dispersive X-ray spectroscopy or electron energy-loss spectroscopy.

The chemical conversion treatment is performed by applying a solution containing a compound used for forming the acid resistance film to a surface of the aluminum alloy foil layer by, for example, bar coating, roll coating, gravure coating, or an immersion method, and then heating the aluminum alloy foil layer such that the temperature of the aluminum alloy foil layer becomes 70° C. or higher and 200° C. or lower. The aluminum alloy foil layer may be degreased beforehand by, for example, an alkali immersion method, an electrolytic cleaning method, an acid cleaning method, or an electrolytic acid cleaning method before subjected to the chemical conversion treatment. When degreasing is performed as described above, the chemical conversion treatment on the surface of the aluminum alloy foil layer can be more efficiently performed.

Figure 4:
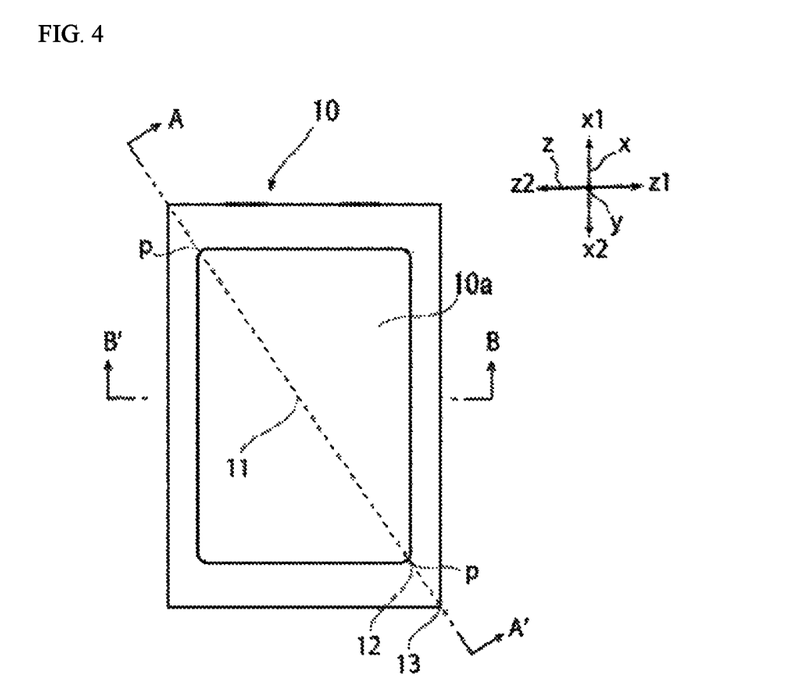
FIG. 4 is a schematic plan view of a molded battery packaging material, for illustrating locations where the thickness of an aluminum alloy foil is to be measured.
Figure 5:
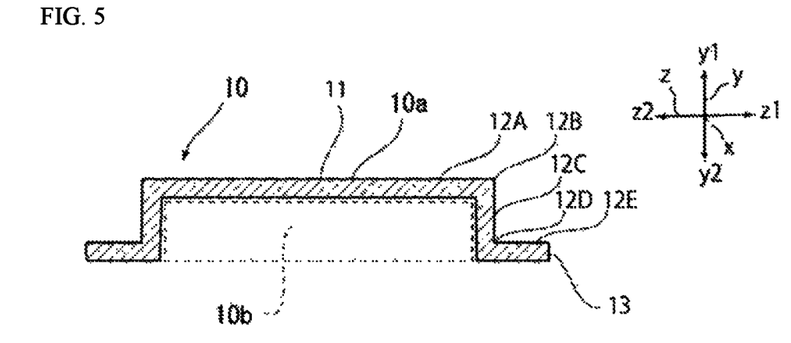
FIG. 5 is a schematic cross-sectional view taken along a line B-B' in FIG. 4.
Figure 6:
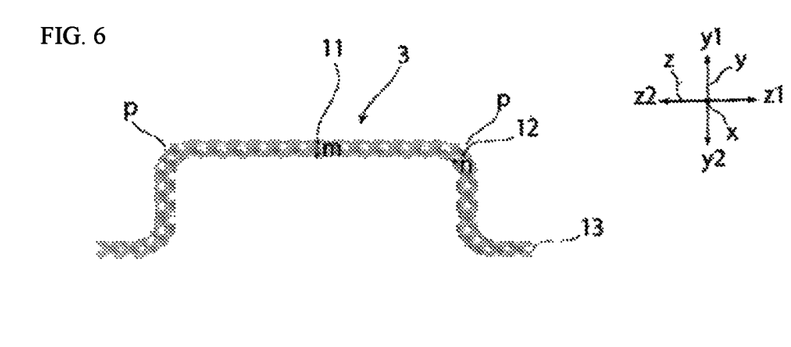
FIG. 6 is a schematic cross-sectional view of the aluminum alloy foil taken along a line A-A' in FIG. 4, for illustrating the locations where the thickness of the aluminum alloy foil is to be measured.

The battery packaging material 10 according to the present invention includes, for example, a substantially rectangular parallelepiped space 10b that extrudes from a heat-weldable resin-layer 4 side to the base material-layer 1 side of the battery packaging material and stores a battery element on the heat-weldable resin-layer 4 side, as shown in FIGS. 4 and 5. The space can be formed by molding a planate battery packaging material with, for example, a mold. In a cross-section along thickness x on a straight line connecting mutually opposing corners p of a portion 10a extruding in substantially rectangular shape, the corners and the straight line being shown in plan view of the battery packaging material 10, which has been thus molded, from the base material-layer 1 side, the battery packaging material includes a horizontal section 12A, a curved section 12B, a side wall 12C, a curved section 12D, and a horizontal section 12E from the center portion 11 (center portion on an upper surface of the rectangular parallelepiped space 10b in FIG. 5) to an end part 13 of the battery packaging material. In this configuration, the battery packaging material 10 according to the present invention is, as shown in FIG. 6, preferably molded such that a ratio (n/m) of thickness n of the aluminum alloy foil layer 3 in the curved section 12B between the horizontal section 12A and the side wall 12C to thickness m of the aluminum alloy foil layer 3 in the center portion 11 is 45% or more and 90% or less, further 60% or more and 90% or less, further 65% or more and 90% or less. This makes the battery packaging material unlikely to generate pinholes and cracks, excellent in appearance after molding, and unlikely to be erroneously determined to be a defective product. The thickness n means the minimum thickness of the curved section 12B. In FIGS. 5 and 6, while the battery packaging material includes, in addition to the curved section 12B situated between the center portion 11 and the end part 13, the other curved section 12D on an end-part 13 side of the battery packaging material, the curved section that is likely to be reduced in thickness by molding and to generate pinholes and cracks is the curved section 12B at the corner p situated on a center-portion 11 side of the battery packaging material. On the other hand, the thickness m of the aluminum alloy foil layer 3 in the center portion 11 is small in variation of thickness between before and after molding (normally, variation in thickness is 0% or more and 20% or less).

The thickness m and n of the aluminum alloy foil layer 3 in the battery packaging material 10 according the present invention is a value measured by dividing the battery packaging material 10 into two parts through cutting the battery packaging material along its thickness with a microtome, on the straight line A-A' connecting the mutually opposing corners p of the portion 10a extruding in substantially rectangular shape in plan view of the battery packaging material from the base material-layer 1 side, and observing the obtained cross-section with a laser microscope. Specifically, the thickness of the aluminum alloy foil layer is a value measured by a method described in examples. It is desirable to perform cutting and thickness measurement after fixing a molded battery packaging material with, for example, a resin, for preventing a change in shape of the battery packaging material during cutting with a microtome and observation of the cross-section with a laser microscope.

[Heat-Weldable Resin Layer 4]

In the battery packaging material according to the present invention, the heat-weldable resin layer 4 corresponds to an innermost layer and is a layer whose portions are heat-welded to each other during assembly of a battery to hermetically seal a battery element in the heat-weldable resin layer.

A resin component used for the heat-weldable resin layer 4 is not particularly limited as long as it can be heat-welded, and examples of the resin component include a polyolefin, a cyclic polyolefin, an acid-modified polyolefin, and an acid-modified cyclic polyolefin. That is, the heat-weldable resin layer 4 may optionally have a polyolefin backbone but preferably has a polyolefin backbone. The polyolefin backbone contained in the heat-weldable resin layer 4 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 cm−1 and around 1780 cm−1. When the degree of acid modification is low, however, a peak becomes small to be sometimes undetected. In that case, analysis can be performed by nuclear magnetic resonance spectroscopy.

Specific examples of the polyolefin include polyethylene such as low-density polyethylene, medium-density polyethylene, high-density polyethylene, and linear low-density polyethylene; polypropylene such as homopolypropylene, polypropylene as a block copolymer (e.g., a block copolymer of propylene and ethylene), and polypropylene as a random copolymer (e.g., a random copolymer of propylene and ethylene); and a terpolymer of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes such as norbornene; specific examples include cyclic dienes such as cyclopentadiene, dicyclopentadiene, cyclohexadiene, and norbornadiene. Among these polyolefins, cyclic alkenes are preferred, and norbornene is further preferred. It is also possible to use styrene as a monomer.

The acid-modified polyolefin is a polymer obtained by modifying the polyolefin with an acid component such as a carboxylic acid through block polymerization or graft polymerization. Examples of the acid component used for the modification include carboxylic acids and anhydrides thereof such as maleic acid, acrylic acid, itaconic acid, crotonic acid, maleic anhydride, and itaconic anhydride.

The acid-modified cyclic polyolefin is a polymer obtained by copolymerizing the cyclic polyolefin and an α,β-unsaturated carboxylic acid or an anhydride thereof, with a part of a monomer that constitute the cyclic polyolefin replaced with the α,β-unsaturated carboxylic acid or the anhydride thereof, or by block-polymerizing or graft-polymerizing the cyclic polyolefin with an α,β-unsaturated carboxylic acid or an anhydride thereof. The cyclic polyolefin to be modified with an acid is the same as described above. The acid component used for the modification is the same as used for the modification of the polyolefin.

Among these resin components, preferred are polyolefins such as polypropylene, and an acid-modified polyolefin; further preferred is acid-modified polypropylene.

The heat-weldable resin layer 4 may be formed of one resin component alone or a blended polymer obtained by combining two or more resin components. Further, the heat-weldable resin layer 4 may be formed of only one layer or two or more layers with the same resin component or different resin components.

The thickness of the heat-weldable resin layer 4 is not particularly limited as long as it exerts a function as the heat-weldable resin layer. An upper limit of the thickness, however, is, for example, preferably 90 μm or less, more preferably 80 μm or less, further preferably 60 μm or less, particularly preferably 40 μm or less. The thickness of the heat-weldable resin layer 4 is, as a range, for example, preferably 15 μm or more and 90 μm or less, more preferably 15 μm or more and 80 μm or less, further preferably 15 μm or more and 60 μm or less, particularly preferably 15 μm or more and 40 μm or less.

[Adhesive Layer 5]

In the battery packaging material according to the present invention, the adhesive layer 5 is a layer provided between the aluminum alloy foil layer 3 and the heat-weldable resin layer 4 as necessary, for strongly adhering these layers to each other.

The adhesive layer 5 is formed of an adhesive agent capable of adhering the aluminum alloy foil layer 3 to the heat-weldable resin layer 4. The resin used for forming the adhesive layer 5, the adhesive mechanism of the resin, and the type of an adhesive agent component are the same as those in the case of the adhesive layer 2. As the resin used for forming the adhesive layer 5, it is also possible to use polyolefin-based resins exemplified for the heat-weldable resin layer 4, such as a polyolefin, a cyclic polyolefin, a carboxylic acid-modified polyolefin, and a carboxylic acid-modified cyclic polyolefin. The polyolefin is preferably a carboxylic acid-modified polyolefin, particularly preferably a carboxylic acid-modified polypropylene, because they are excellent in adhesion between the aluminum alloy foil layer 3 and the heat-weldable resin layer 4. That is, the adhesive layer 5 may optionally have a polyolefin backbone but preferably has a polyolefin backbone. The polyolefin backbone contained in the adhesive layer 5 can be confirmed by analysis such as infrared spectroscopy or gas chromatography-mass spectrometry, and the analysis method is not particularly restricted. For example, measurement of a maleic anhydride-modified polyolefin by infrared spectroscopy detects peaks derived from maleic anhydride at wave numbers of around 1760 cm−1 and around 1780 cm−1. When the degree of acid modification is low, however, a peak becomes small to be sometimes undetected. In that case, analysis can be performed by nuclear magnetic resonance spectroscopy.

Further, the adhesive layer 5 may be a cured product of a resin composition containing an acid-modified polyolefin and a curing agent, so as to provide the battery packaging material excellent in shape stability after molding while reducing the thickness of the battery packaging material. As the acid-modified polyolefin, there can be exemplified the same carboxylic acid-modified polyolefin and carboxylic acid-modified cyclic polyolefin as those exemplified for the heat-weldable resin layer 4.

The curing agent is not particularly limited as long as it cures the acid-modified polyolefin. Examples of the curing agent include an epoxy-based curing agent, a polyfunctional isocyanate-based curing agent, a carbodiimide-based curing agent, and an oxazoline-based curing agent.

The epoxy-based curing agent is not particularly limited as long as it is a compound having at least one epoxy group. Examples of the epoxy-based curing agent include epoxy resins such as bisphenol A diglycidyl ether, modified bisphenol A diglycidyl ether, novolak glycidyl ether, glycerin polyglycidyl ether, and polyglycerin polyglycidyl ether.

The polyfunctional isocyanate-based curing agent is not particularly limited as long as it is a compound having two or more isocyanate groups. Specific examples of the polyfunctional isocyanate-based curing agent include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymerized products thereof with another polymer.

The carbodiimide-based curing agent is not particularly limited as long as it is a compound having at least one carbodiimide group (—N=C=N—). The carbodiimide-based curing agent is preferably a polycarbodiimide compound having at least two carbodiimide groups.

The oxazoline-based curing agent is not particularly limited as long as it is a compound having an oxazoline backbone. Specific examples of the oxazoline-based curing agent include EPOCROS Series manufactured by NIPPON SHOKUBAI CO., LTD.

The curing agent may be formed of two or more compounds so as to increase the adhesion between the aluminum alloy foil layer 3 and the heat-weldable resin layer 4 by the adhesive layer 5.

The content of the curing agent in the resin composition for forming the adhesive layer 5 is preferably in a range of about 0.10% by mass or more and about 50% by mass or less, more preferably in a range of about 0.10% by mass or more and about 30% by mass or less, further preferably in a range of about 0.10% by mass or more and about 10% by mass or less.

The thickness of the adhesive layer 5 is not particularly limited as long as it allows the battery packaging material to satisfy the above-mentioned physical properties while exerting a function as the adhesive layer. When an adhesive agent exemplified for the adhesive layer 2 is used, however, the thickness of the adhesive layer 5 is, for example, preferably about 1 μm or more and about 10 μm or less, more preferably about 1 μm or more and about 5 μm or less. When a resin exemplified for the heat-weldable resin layer 4 is used, the thickness of the adhesive layer 5 is, for example, preferably about 2 μm or more and about 50 μm or less, more preferably about 10 μm or more and about 40 μm or less. When the adhesive layer 5 is a cured product of an acid-modified polyolefin and a curing agent, the thickness of the adhesive layer 5 is, for example, preferably 30 μm or less, more preferably about 0.1 μm or more and about 20 μm or less, further preferably about 0.5 μm or more and about 5 μm or less. When the adhesive layer 5 is a cured product of a resin composition containing an acid-modified polyolefin and a curing agent, it is possible to form the adhesive layer 5 by application of the resin composition followed by, for example, heating for curing.

[Surface Coating Layer]

In the battery packaging material according to the present invention, a surface coating layer (not shown) may be provided on the base material layer 1 (the base material layer 1's surface opposite to the aluminum alloy foil layer 3) as necessary, for the purpose of, for example, improving designability, electrolytic solution resistance, scratch resistance, and moldability. The surface coating layer is a layer situated at an outermost layer when a battery is assembled.

The surface coating layer can be formed of, for example, polyvinylidene chloride, a polyester resin, a urethane resin, an acrylic resin, or an epoxy resin. Among these resins, the surface coating layer is preferably formed of a two-liquid curable resin. Examples of the two-liquid curable resin for forming the surface coating layer include a two-liquid curable urethane resin, a two-liquid curable polyester resin, and a two-liquid curable epoxy resin. The surface coating layer may also contain an additive.

Examples of the additive include fine particles having a particle size of 0.5 nm or more and 5 μm or less. A material for the additive is not particularly limited, and examples of the material include a metal, a metal oxide, an inorganic substance, and an organic substance. The shape of the additive is not particularly limited, and examples of the shape include a spherical shape, a fibrous shape, a plate shape, an amorphous shape, and a balloon shape. Specific examples of the additive include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylon, crosslinked acrylic, crosslinked styrene, crosslinked polyethylene, benzoguanamine, gold, aluminum, copper, and nickel. These additives may be used alone or in combination of two or more thereof. Among these additives, silica, barium sulfate, and titanium oxide are preferred from a viewpoint of, for example, dispersion stability and costs. The additive may have the surface thereof subjected to various surface treatments such as an insulation treatment and a dispersibility enhancing treatment.

The content of the additive in the surface coating layer is not particularly limited but is, for example, preferably 0.05% by mass or more and 1.0% by mass or less, more preferably 0.1% by mass or more and 0.5% by mass or less.

A method for forming the surface coating layer is not particularly limited, and examples of the method include a method for applying a two-liquid curable resin for forming the surface coating layer onto one surface of the base material layer 1. When the additive is blended, application may be performed after the additive is added to and mixed with the two-liquid curable resin.

The thickness of the surface coating layer is not particularly limited as long as it allows the battery packaging material to satisfy the above-mentioned physical properties while exerting the above-mentioned functions as the surface coating layer. The thickness of the surface coating layer, however, is, for example, 0.5 μm or more and 10 μm or less, preferably 1 μm or more and 5 μm or less.

3. Method for Manufacturing Battery Packaging Material

A method for manufacturing a battery packaging material according to the present invention is not particularly limited as long as the method is capable of giving a laminate obtained by laminating layers that each have predetermined composition. It is possible to employ a manufacturing method including a step of laminating at least a base material layer 1, an aluminum alloy foil layer 3, and a heat-weldable resin layer 4 in this order to give a laminate, with an aluminum alloy foil layer 3 having the following physical properties used as the aluminum alloy foil layer 3.

The aluminum alloy foil layer 3 has a thickness of 40 μm or less.

The aluminum alloy foil layer 3 is an aluminum alloy conforming to JIS A8021.

The aluminum alloy has a maximum crystal grain size of 25 μm or less and an average crystal grain size of 10 μm or less. That is, it is possible to manufacture the battery packaging material according to the present invention by laminating the layers using, as the aluminum alloy foil layer 3, the aluminum alloy foil layer 3 described in the section "2. Layers Forming Battery Packaging Material."

One example of the method for manufacturing a battery packaging material according to the present invention is as follows. First, a laminate (hereinafter, sometimes also referred to as a "laminate A") is formed that includes the base material layer 1, an adhesive layer 2, and the aluminum alloy foil layer 3 in this order. Specifically, the laminate A can be formed by a dry lamination method that includes applying an adhesive agent used for forming the adhesive layer 2 onto the base material layer 1 or the aluminum alloy foil layer 3 having a surface thereof subjected to a chemical conversion treatment as necessary by an application method such as gravure coating or roll coating, followed by drying, then laminating the aluminum alloy foil layer 3 or the base material layer 1, and curing the adhesive layer 2.

Next, the heat-weldable resin layer 4 is laminated on the aluminum alloy foil layer 3 of the laminate A. When the heat-weldable resin layer 4 is directly laminated on the aluminum alloy foil layer 3, a resin component for constituting the heat-weldable resin layer 4 may be applied onto the aluminum alloy foil layer 3 of the laminate A by a method such as gravure coating or roll coating. When an adhesive layer 5 is provided between the aluminum alloy foil layer 3 and the heat-weldable resin layer 4, there can be exemplified (1) a method for laminating, through coextrusion, the adhesive layer 5 and the heat-weldable resin layer 4 on the aluminum alloy foil layer 3 of the laminate A (coextrusion lamination method); (2) a method for separately forming a laminate having the adhesive layer 5 and the heat-weldable resin layer 4 laminated therein and laminating the laminate on the aluminum alloy foil layer 3 of the laminate A by a thermal lamination method; (3) a method for laminating an adhesive agent for forming the adhesive layer 5 on the aluminum alloy foil layer 3 of the laminate A by, for example, an extrusion method or solution coating, drying at high temperature, and further baking, and laminating the heat-weldable resin layer 4, which has been formed in a sheet shape beforehand, on the adhesive layer 5 by a thermal lamination method; and (4) a method for pouring the adhesive layer 5, which has been melted, into between the aluminum alloy foil layer 3 of the laminate A and the heat-weldable resin layer 4 that has been formed in a sheet shape beforehand and simultaneously bonding the laminate A to the heat-weldable resin layer 4 with the adhesive layer 5 interposed therebetween (sandwich lamination method).

When a surface coating layer is provided, the surface coating layer is laminated on the base material layer 1's surface opposite to the aluminum alloy foil layer 3. The surface coating layer can be formed by, for example, applying the resin for forming the surface coating layer to the surface of the base material layer 1. As regards the step of laminating the aluminum alloy foil layer 3 on a surface of the base material layer 1 and the step of laminating the surface coating layer on a surface of the base material layer 1, the order of the steps is not particularly limited. For example, the surface coating layer may be formed on a surface of the base material layer 1, followed by forming the aluminum alloy foil layer 3 on the base material layer 1's surface opposite to the surface coating layer.

As described above, a laminate is formed that includes the surface coating layer provided as necessary, the base material layer 1, the adhesive layer 2 provided as necessary, the aluminum alloy foil layer 3 having the surface thereof subjected to a chemical conversion treatment as necessary, the adhesive layer 5 provided as necessary, and the heat-weldable resin layer 4. The laminate may be further subjected to a hot roll contact-type, hot air-type, or near- or far-infrared-type heating treatment, for strengthening the adhesiveness of the adhesive layer 2 and the adhesive layer 5 that are provided as necessary. As the conditions for such a heating treatment, there can be exemplified heating at a temperature of 150° C. or higher and 250° C. or lower for a period of 1 minute or more and 5 minutes or less.

In the battery packaging material according to the present invention, the layers that constitute the laminate may be subjected to a surface activation treatment such as a corona treatment, a blast treatment, an oxidation treatment, or an ozone treatment as necessary, for improving or stabilizing, for example, film formability, lamination processing, and final product secondary processing (pouching and embossing molding) suitability. For example, subjecting at least one surface of the base material layer to a corona treatment enables improvement or stabilization of, for example, film formability, lamination processing, and final product secondary processing suitability. Further, for example, subjecting the base material layer 1's surface opposite to the aluminum alloy foil layer 3 to a corona treatment enables improvement of ink printability on the surface of the base material layer 1.

4. Method for Determining Defect During Molding of Battery Packaging Material

A method for determining a defect during molding of a battery packaging material according to the present invention is characterized by including the following steps 1 to 3.

Step 1: preparing a battery packaging material that includes a laminate having at least a base material layer 1, an aluminum alloy foil layer 3, and a heat-weldable resin layer 4 in this order, the aluminum alloy foil layer 3 having a thickness of 40 μm or less, the aluminum alloy foil layer 3 being an aluminum alloy conforming to JIS A8021, and the aluminum alloy having a maximum crystal grain size of 25 μm or less and an average crystal grain size of 10 μm or less.

Step 2: subjecting the battery packaging material to molding.

Step 3: determining whether or not pinholes or cracks have been formed on the aluminum alloy foil from an image obtained by capturing a surface of the battery packaging material molded. The surface of the battery packaging material molded can be captured with, for example, a camera.

According to the method for determining a defect during molding of a battery packaging material according to the present invention, it is possible to appropriately determine whether or not pinholes or cracks have been formed in the battery packaging material molded, because formation of a fine recess and projection pattern is, by using the battery packaging material according to the present invention, inhibited from being formed on a surface of the aluminum alloy foil layer during molding. Therefore, it is possible to effectively suppress a decrease of yield in manufacture of batteries caused by the battery packaging material that has generated no pinholes and cracks but is nevertheless determined to be a defective product.

5. Use of Battery Packaging Material

The battery packaging material according to the present invention is used as a package for hermetically sealing and storing a battery element such as a positive electrode, a negative electrode, and an electrolyte therein. That is, it is possible to store a battery element in a package formed of the battery packaging material according to the present invention.

Specifically, a battery element including at least a positive electrode, a negative electrode, and an electrolyte is covered with a package formed of the battery packaging material according to the present invention such that a flange part (region where portions of a heat-weldable resin layer 4 are in contact with each other) can be formed on a periphery of the battery element while metal terminals connected to the positive electrode and the negative electrode respectively are allowed to extrude exteriorly, and the portions of the heat-weldable resin layer 4 at the flange part are hermetically heat-sealed to each other, thereby providing a battery produced by using the battery packaging material. When a battery element is stored using the battery packaging material according to the present invention, the battery packaging material according to the present invention is used such that a heat-weldable resin portion comes inside (surface in contact with the battery element).

The battery packaging material according to the present invention may be used for either a primary battery or a secondary battery but is preferably used for a secondary battery. The type of the secondary battery to which the battery packaging material according to the present invention is applied is not particularly limited, and examples of the secondary battery include a lithium ion battery, a lithium ion polymer battery, a lead storage battery, a nickel-hydrogen storage battery, a nickel-cadmium storage battery, a nickel-iron storage battery, a nickel-zinc storage battery, a silver oxide-zinc storage battery, a metal-air battery, a polyvalent cation battery, a condenser, and a capacitor. Among these secondary batteries, a lithium ion battery and a lithium ion polymer battery are suitable subjects for application of the battery packaging material according to the present invention.

EXAMPLES

The present invention is described in detail below by way of examples and comparative examples. It is to be noted that the present invention is not limited to the examples. Values measured by the method described above are adopted as the average crystal grain size and the maximum crystal grain size of the aluminum alloy foils used for manufacture of the following battery packaging materials.

Examples 1 to 9, Comparative Examples 1 to 4, Reference Examples 1 to 3

<Manufacture of Battery Packaging Material>

An aluminum alloy foil having both surfaces thereof subjected to a chemical conversion treatment was laminated on a biaxially stretched nylon film (thickness: 15 μm) as a base material layer by a dry lamination method. Specifically, a two-liquid urethane adhesive agent (a polyol compound and an aromatic isocyanate-based compound) was applied to one surface of the aluminum alloy foil indicated in Table 1 to form an adhesive layer (thickness: 3 μm) on the aluminum alloy foil layer. Next, the adhesive layer on the aluminum alloy foil layer and the base material layer were laminated by a dry lamination method and then subjected to an aging treatment to produce a laminate including the base material layer, the adhesive layer, and the aluminum alloy foil layer. The chemical conversion treatment for the aluminum foil was performed by applying to both surfaces of the aluminum foil a treatment solution containing a phenolic resin, a chromium fluoride compound, and phosphoric acid through roll coating such that the application amount of chromium was 10 mg/m$^2$ (dry weight), and baking the aluminum foil. Next, 20-μm-thick carboxylic acid-modified polypropylene (disposed on the aluminum alloy foil layer) and 20-μm-thick random polypropylene (innermost layer) were coextruded on the aluminum alloy foil layer of the laminate to laminate an adhesive layer and a heat-weldable resin layer on the aluminum alloy foil layer. Specific materials for the aluminum alloy foil are as follows and as indicated in Table 1.

<Aluminum Alloy Foil>

A8021: soft aluminum (JIS H4160: 1994 A8021H-O)

1N30: soft aluminum (JIS H4160: 1994 1N30)

The average crystal grain size and the maximum crystal grain size of the aluminum alloys were adjusted by changing, for example, the rolling conditions. That is, the aluminum alloys manufactured by variously changing, for example, the rolling conditions were measured for the average crystal grain size and the maximum crystal grain size and thereafter used for manufacture of the battery packaging materials in the examples, the comparative examples, and the reference examples.

<Measurement of Average Crystal Grain Size and Maximum Crystal Grain Size of Aluminum Alloy Foil>

The average crystal grain size of the aluminum alloys used as the aluminum alloy foil layers in the examples, the comparative examples, and the reference examples means a value obtained by observing a cross-section along the thickness of the aluminum alloy foil with a scanning electron microscope (SEM), measuring a maximum diameter x for each of any 100 crystal grains of the aluminum alloy situated in a field, and averaging the maximum diameters x of the 100 crystal grains. The maximum diameter x of each of the crystal grains means, as shown in the schematic view of FIG. 7, a diameter that makes the largest straight distance connecting between one point on an outline of a crystal grain observed with the SEM and another point on the outline of the same crystal grain. The maximum crystal grain size denoted the largest value among the maximum diameters x of the 100 crystal grains. The cross-section along the thickness of the aluminum alloy foil layer that is observed with the SEM is a cut surface obtained by cutting the aluminum alloy foil layer along a surface vertical to a rolling direction. The cross-section along the thickness of the aluminum alloy foil layer is a cross-section obtained by cutting the aluminum alloy foil layer along its thickness with a microtome, and when the aluminum alloy foil layer is cut with a microtome, it is desirable to cut the aluminum alloy foil layer after fixing the aluminum alloy with, for example, a resin, for preventing a change in shape of the aluminum alloy foil. The maximum crystal grain size and the average crystal grain size of the aluminum alloy can be measured even in a state where the aluminum alloy is laminated in a battery packaging material, and the analysis conditions are the same as described above for the aluminum alloy foil, except that the cross-section of the aluminum alloy is obtained by cutting the battery packaging material along the thickness of the aluminum alloy foil layer after fixing the battery packaging material with, for example, a resin, for preventing a change in shape of the battery packaging material.

(Evaluation of Moldability)

Each of the battery packaging materials obtained as described above was cut into a rectangle with 80 mm×120 mm to produce a sample. The sample was cold-molded using a mold (female mold) having an opening size of 30×50 mm and a corresponding mold (male mold). The cold molding was performed while the molding depth was changed by 0.5-mm lengths from a molding depth of 0.5 mm with a pressing force of 0.4 MPa, and 10 samples were subjected to the cold molding at each depth. Determined as limited molding depth for the sample of each of the battery packaging materials was the deepest molding depth at which none of the 10 cold-molded samples generated either pinholes or cracks in their battery packaging materials. From the limited molding depth, the moldability of the battery packaging materials was evaluated in accordance with the following criteria. Table 1 shows the evaluation results.

A: limited molding depth of more than 5.5 mm

B: limited molding depth of 4.0 mm or more and 5.5 mm or less

C: limited molding depth of 3.5 mm or less (Evaluation of Appearance after Molding with Molding Depth of 5.5 mm)

A surface of each of the battery packaging materials molded with a molding depth of 5.5 mm was captured with a camera, and the obtained image was observed by visual inspection to confirm whether or not a fine recess and projection pattern (pocked pattern) was formed on a surface of the aluminum alloy foil. The battery packaging material was determined to have good appearance (evaluation: A) when recognized as having no fine recess and projection pattern (pocked pattern) formed on the surface of the aluminum alloy foil and the battery packaging material was determined to have poor appearance (evaluation: C) when recognized as having a fine recess and projection pattern (pocked pattern) formed on the surface of the aluminum alloy foil. The battery packaging material was determined to be evaluation B when having a fine recess and projection pattern (pocked pattern) slightly formed in a small area of the surface of the aluminum alloy foil. Table 1 shows the formation results. All the molded battery packaging materials subjected to the evaluation of appearance had generated neither pinholes nor cracks. In Table 1, the symbol "-" denotes no evaluation performed.

<Measurement of Thickness of Aluminum Alloy Foil Layer after Molding with Molding Depth of 5.5 mm>

Each of the battery packaging materials 10 that were molded with a molding depth of 5.5 mm was divided into two parts by cutting the battery packaging material 10 along its thickness with a microtome (REM-710 RETORATOME manufactured by YAMATO KOHKI INDUSTRIAL CO., LTD.), on a straight line connecting mutually opposing corners p of a portion 10a extruding in substantially rectangular shape in plan view of the battery packaging material from a base material-layer side of the battery packaging material, the obtained cross-section was observed with a laser microscope (VKX-100 manufactured by KEYENCE CORPORATION), and thickness m of the aluminum alloy foil layer in a center portion 11 and thickness n of the aluminum alloy foil layer in a curved section 12 (curved section 12B) were measured to derive a ratio (n/m (%)) of n to m. Table 1 shows the evaluation results. When the battery packaging material is cut with a microtome, it is necessary to cut the battery packaging material after fixing the molded battery aluminum alloy with, for example, a resin, for preventing a change in shape of the battery packaging material.

TABLE 1

| | | Aluminum alloy foil | | | | | | | |
|---|---|---|---|---|---|---|---|---|---|
| | Material | Maximum crystal grain size (μm) | Average crystal grain size (μm) | Thickness (μm) | Thickness in center portion after molding m (μm) | Thickness in curved section after molding n (μm) | n/m (%) | Moldability | Appearance after molding |
| Example 1 | A8021 | 14 | 8 | 25 | 24 | 18 | 75 | A | A |
| Example 2 | A8021 | 12 | 5 | 25 | 24 | 18 | 75 | A | A |
| Example 3 | A8021 | 10 | 2 | 25 | 24 | 18 | 75 | A | A |
| Example 4 | A8021 | 12 | 5 | 25 | 22 | 15 | 68 | A | A |
| Example 5 | A8021 | 18 | 8 | 30 | 28 | 20 | 71 | A | A |
| Example 6 | A8021 | 14 | 4 | 35 | 34 | 26 | 76 | A | A |
| Example 7 | A8021 | 19 | 5 | 35 | 32 | 18 | 56 | A | A |
| Example 8 | A8021 | 8 | 2 | 35 | 33 | 16 | 48 | A | A |
| Example 9 | A8021 | 20 | 9 | 40 | 39 | 30 | 77 | A | A |
| Comparative Example 1 | A8021 | 20 | 11 | 25 | 24 | 18 | 75 | A | C |
| Comparative Example 2 | A8021 | 32 | 10 | 40 | 38 | 30 | 79 | A | C |
| Comparative Example 3 | A8021 | 28 | 18 | 40 | 38 | 30 | 79 | A | C |
| Comparative Example 4 | 1N30 | 24 | 10 | 40 | 38 | 30 | 79 | C | — |
| Reference Example 1 | A8021 | 30 | 13 | 50 | 48 | 36 | 75 | A | B |
| Reference Example 2 | A8021 | 29 | 9 | 50 | 48 | 34 | 71 | A | B |
| Reference Example 3 | A8021 | 18 | 12 | 50 | 48 | 36 | 75 | A | B |

As is clear from the results shown in Table 1, the battery packaging materials in Examples 1 to 9 were excellent in moldability despite the aluminum alloy foil layer having a thickness of 40 μm or less because the aluminum alloy foil layer was an aluminum alloy conforming to JIS A8021 and the aluminum alloy had a maximum average crystal grain size of 25 μm or less and an average crystal grain size of 10 μm less. Further, the battery packaging materials in Examples 1 to 9 were recognized as having no fine recess and projection pattern (pocked pattern) formed on the surface of the aluminum alloy foil after molding and had good appearance. The battery packaging materials in Examples 1 to 9 were excellent in appearance after molding, were unlikely to be erroneously determined to have generated cracks on the aluminum alloy foil, and allowed highly accurate defect determination.

On the other hand, the battery packaging materials in Comparative Examples 1 to 3 were merely excellent in moldability, in which the aluminum alloy used conformed to JIS A8021 but the aluminum alloy had a maximum average crystal grain size of more than 25 μm and an average crystal grain size of 10 μm or more. The battery packaging materials in Comparative Examples 1 to 3 were recognized as having a fine recess and projection pattern (pocked pattern) formed on the surface of the aluminum alloy foil after molding and had poor appearance. The battery packaging materials in Comparative Examples 1 to 3 were inferior in appearance after molding, were likely to be erroneously determined to have generated cracks on the aluminum alloy foil, and were unlikely to allow highly accurate defect determination. The battery packaging material in Comparative Example 4 that contained an aluminum alloy conforming to JIS 1N30 was inferior in moldability to the battery packaging materials in Examples 1 to 9. The battery packaging materials in Reference Examples 1 to 3 were excellent in moldability because the aluminum alloy foil had a thickness of as large as 50 μm and thus gave no problem of decreasing the moldability due to having small thickness.

DESCRIPTION OF REFERENCE SIGNS

1: Base material layer
2: Adhesive layer
3: Aluminum alloy foil layer
4: Heat-weldable resin layer
5: Adhesive layer
10: Battery packaging material
10a: Portion extruding in substantially rectangular shape
11: Center portion in plan view of battery packaging material
12: Curved section
13: End part
P: Corner of portion extruding in substantially rectangular shape

The invention claimed is:
1. A battery packaging material comprising:
a laminate that includes at least a base material layer, an aluminum alloy foil layer, and a heat-weldable resin layer in this order;
a substantially rectangular parallelepiped space that is extruded from a heat-weldable resin-layer side to a base material-layer side of the battery packaging material and is configured to store a battery element on the heat-weldable resin-layer side; and
a curved section from a center portion to an end part of the battery packaging material in a cross-section along thickness of the battery packaging material on a straight line connecting mutually opposing corners of a portion extruded in substantially rectangular shape, the corners and the straight line being shown in plan view of the battery packaging material from the base material-layer side, wherein:
the aluminum alloy foil layer has a thickness of 35 μm or less;
the aluminum alloy foil layer is an aluminum alloy conforming to JIS A8021;

the aluminum alloy has a maximum crystal grain size of 14 µm or less and an average crystal grain size of 9 µm or less; and a ratio (n/m) of thickness n of the aluminum alloy foil layer in the curved section to thickness m of the aluminum alloy foil layer in the center portion is 45% or more and 90% or less.

2. The battery packaging material according to claim 1, wherein the laminate has a thickness of 150 µm or less.

3. The battery packaging material according to claim 1, wherein the base material layer has a thickness of 30 µm or less.

4. The battery packaging material according to claim 1, wherein the heat-weldable resin layer has a thickness of 90 µm or less.

5. The battery packaging material according to claim 1, wherein the base material layer is formed of at least one of a polyester resin or a polyamide resin.

6. The battery packaging material according to claim 1, wherein the aluminum alloy foil layer includes an acid resistance film layer on at least one surface of the aluminum alloy foil layer.

7. The battery packaging material according to claim 1, being a packaging material for a secondary battery.

8. A battery comprising: a battery element that includes at least a positive electrode, a negative electrode, and an electrolyte; and a package that is formed of the battery packaging material according to claim 1 and stores the battery element therein.

9. A method for manufacturing a battery packaging material, the method comprising:
  laminating at least a base material layer, an aluminum alloy foil layer, and a heat-weldable resin layer in this order to give laminate; and
  molding the laminate to form a substantially rectangular parallelepiped space that is extruded from a heat-weldable resin-layer side to a base material-layer side of the battery packaging material and is configured to store a battery element on the heat-weldable resin-layer side such that a curved section from a center portion to an end part of the battery packaging material in a cross-section along thickness of the battery packaging material on a straight line connects mutually opposing corners of a portion extruded in substantially rectangular shape, the corners and the straight line being shown in plan view of the battery packaging material from the base material-layer side, wherein:
  the aluminum alloy foil layer has a thickness of 35 µm less;
  the aluminum alloy foil layer is an aluminum alloy conforming to JIS A8021;
  the aluminum alloy has a maximum crystal grain size of 14 µm or less and an average crystal grain size of 9 µm or less; and
  a ratio (n/m) of thickness n of the aluminum alloy foil layer in the curved section to thickness m of the aluminum alloy foil layer in the center portion is 45% or more and 90% or less.

10. A method for determining a defect during molding of a battery packaging material, the method comprising:
  manufacturing the battery packaging material by the method according to claim 9; and
  determining whether or not pinholes or cracks exist on the aluminum alloy foil from an image obtained by capturing a surface of the battery packaging material.

11. The battery packaging material according to claim 1, wherein the aluminum alloy foil layer has a thickness of 30 µm or less, and the aluminum alloy has a maximum crystal grain size of 10 µm or less and an average crystal grain size of 5 µm or less.

12. The battery packaging material according to claim 1, wherein the ratio (n/m) of thickness n of the aluminum alloy foil layer in the curved section to thickness m of the aluminum alloy foil layer in the center portion is 45% or more and 77% or less.

13. The battery packaging material according to claim 1, wherein the ratio (n/m) of thickness n of the aluminum alloy foil layer in the curved section to thickness m of the aluminum alloy foil layer in the center portion is 45% or more and 76% or less.

14. A battery packaging material comprising:
  a laminate that includes at least a base material layer, an aluminum alloy foil layer, and a heat-weldable resin layer in this order;
  a substantially rectangular parallelepiped space that is extruded from a heat-weldable resin-layer side to a base material-layer side of the battery packaging material and is configured to store a battery element on the heat-weldable resin-layer side; and
  a curved section from a center portion to an end part of the battery packaging material in a cross-section along thickness of the battery packaging material on a straight line connecting mutually opposing corners of a portion extruded in substantially rectangular shape, the corners and the straight line being shown in plan view of the battery packaging material from the base material-layer side, wherein:
  the aluminum alloy foil layer has a thickness of 40 µm or less;
  the aluminum alloy foil layer is an aluminum alloy conforming to JIS A8021;
  the aluminum alloy has a maximum crystal grain size of 20 µm or less and an average crystal grain size of 9 µm or less; and
  a ratio (n/m) of thickness n of the aluminum alloy foil layer in the curved section to thickness m of the aluminum alloy foil layer in the center portion is 45% or more and 90% or less.

* * * * *